March 25, 1958     T. I. ERSTAD ET AL     2,828,141
TRAINER WHEEL SUPPORT FOR BICYCLES
Filed May 18, 1956     2 Sheets-Sheet 1
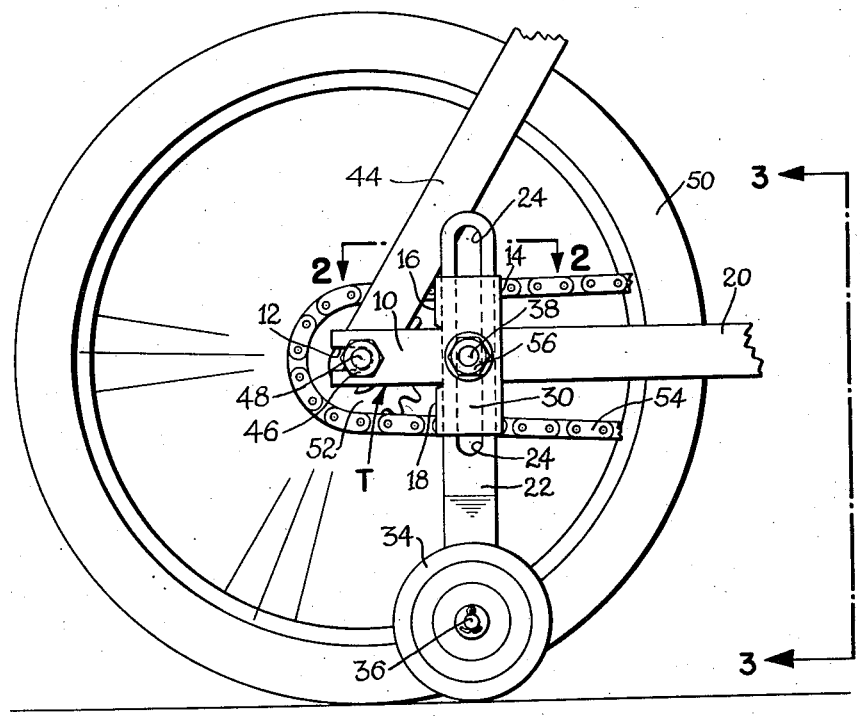
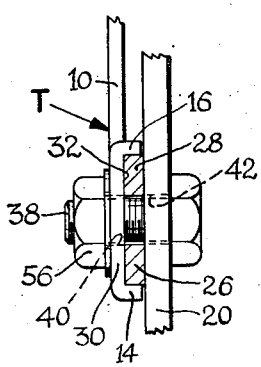
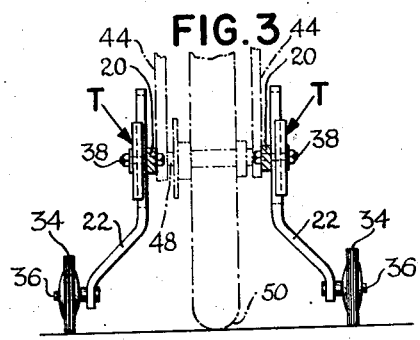
INVENTORS,
TENNES I. ERSTAD,
WILLIAM G. ROADMAN
BY
Tennes J Erstad
ATTORNEY March 25, 1958    T. I. ERSTAD ET AL    2,828,141
TRAINER WHEEL SUPPORT FOR BICYCLES Filed May 18, 1956      2 Sheets-Sheet 2

INVENTORS,
TENNES I. ERSTAD,
WILLIAM G. ROADMAN
BY
ATTORNEY

United States Patent Office 2,828,141
Patented Mar. 25, 1958

2,828,141

TRAINER WHEEL SUPPORT FOR BICYCLES

Tennes I. Erstad, Brooklyn, N. Y., and William Garold Roadman, Hammond, Ind., assignors, by mesne assignments, to American Machine & Foundry Company, New York, N. Y., a corporation of New Jersey Application May 18, 1956, Serial No. 585,747

7 Claims. (Cl. 280—304)

This invention relates to a new and simplified bicycle trainer wheel attachment which is designed to be applied to the rear fork of a bicycle to prevent the bicycle from tipping over when a child is learning to ride a two wheeled bicycle.

There have been various trainer wheel attachments developed in the past. Some have been inordinately complex and expensive to build. Others have been too difficult to readily adjust, to facilitate raising and lowering the training wheels to best suit the needs of the child learning to ride the bicycle. Still others have been secured to the rear axle of the bicycle which necessitated the loosening and tightening of the rear axle nut to effect an adjustment of the height of the trainer wheel above the ground. This sometimes resulted in the rear axle's being moved out of place or being too tightly or loosely secured to the rear frame thus interfering with the setting of the rear wheel each time an adjustment of the trainer wheel was made.

It is an object of this invention to provide a trainer wheel support for a bicycle which is of simple design, economical to construct, durable in construction, easy to adjust, and which will not necessitate the loosening or tightening of the rear axle nut of the bicycle to effect an adjustment of the trainer wheel.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 1 is a side view of our improved trainer wheel attachment.

Fig. 2 is a sectional plan view of the trainer wheel attachment taken on line 2—2 of Fig. 1.

Fig. 3 is an end elevation as seen from line 3—3 of Fig. 1 illustrating a pair of trainer wheels and their novel attachment to the rear fork of a bicycle.

Figure 4:
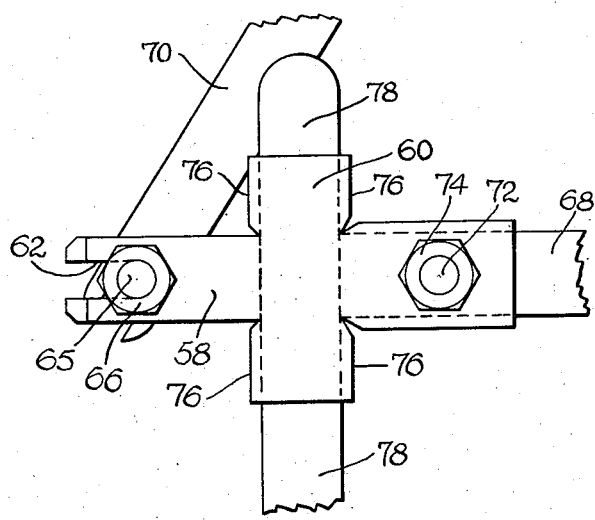
Fig. 4 is a side view of a modified form of our improved trainer wheel attachment.

We have shown in Fig. 1 how the trainer wheel is attached to the rear portion of the bicycle frame. While Figs. 1 and 2 show only one side of the bicycle, it will be appreciated that the trainer wheels are attached to both sides of the bicycle, as illustrated in Fig. 3. Both sides, of course, are of similar design and construction.

Also, in Figs. 1 and 3 we have shown how the trainer wheels ride on the ground simultaneously with the rear wheel. As the child begins to learn how to balance himself the trainer wheels are raised slightly off the ground so that they only touch the ground if the child leans on his bicycle. As he continues to perfect his balancing, the trainer wheels may be adjusted higher and higher untill they are no longer required.

The trainer wheel attachment consists of a T-shaped bracket 10 which has a slotted portion 12 formed at the tail end of the T, while the head end has ears or flanges 14, 16 and 18 formed on opposite sides which extend inwardly towards the lower rear fork 20 of the bicycle. The trainer wheel support bar 22 has a slot 24 and is mounted inside of the flanges so that the sides of the slot 26 and 28 are confined to the guide channel formed by flanges 14, 16 and 18 in the head end 30 of the T and the sides of the support bar are confined between the inside surface 32 of the head end 30 of the T and the lower leg of the rear fork 20, all of which form a channel that confines the bar when adjusted to up and down movement and also supports against twisting and turning.

The lower end of each trainer wheel supporting arm 22 has a trainer wheel 34 mounted on an axle 36 which extends from each arm 22.

Each trainer wheel supporting arm 22 may be raised and lowered inside of its confined channel when the clamp bolt 38 which extends through a hole 40 formed in the head end 30 of the T attachment is loosened. The bolt 38 also extends through a hole 42 formed in the lower leg of rear fork 20, thereby preventing the head end 30 from moving either up or down or sidewise relative to the lower rear fork 20.

The T attachment is prevented from swiveling around the bolt 38 by means of its lower leg 10 being held by the rear axle nut 46 which also securely clamps the rear fork 20 and the upper rear fork 44. When the slotted portion 12 formed in the stem end of the T-shaped bracket is slid behind the rear axle nut 46 in front of the axle supporting end of the rear fork 20 it may be immediately secured in place by tightening the nut 46 which is threaded on the rear axle 48 of the bicycle. The rear axle 48 supports a conventional rear wheel 50 of a bicycle, which is driven in any suitable manner well known in the art by means of a sprocket 52 and sprocket chain 54.

Once the rear axle nut 46 is tightened it need not again be loosened to effect an up and down adjustment of the trainer wheel supporting arm 22 mounted on opposite sides of the bicycle, since it is only necessary to loosen the tightening nut 56 which is threaded on the bolt 38 to effect such an adjustment.

In Fig. 4 we have shown a modified form of our invention wherein the trainer wheel supporting bracket is made in the form of a cross. It will be appreciated that while we show the elongated members making up the cross as being substantially at right angles to each other, one elongated portion of the cross could be at an angle with respect to the other elongated portion, if this is desired.

In this modified form of the invention the bracket consists of an elongated structural support 58 and a transverse structural support 60. The elongated members 58 has a slotted portion 62 which is adapted to be slid over the rear wheel axle 65 and clamped between the rear axle nut 66 and the rear framework 68 and 70.

The opposite end of the elongated member 58 is secured and clamped against the lower rear fork 68 by means of a suitable bolt 72 and nut 74 which pass through holes formed in the opposite end of the elongated member 58 and in the lower rear fork 68.

The transverse elongated member 60 has ears or flanges 76 formed on opposite sides to provide a channel or guide way for the trainer wheel supporting arms 78 which are positioned inside of this guide way and are able to be moved up and down in the vertically extending guide way formed in the elongated member 60.

When the bolt and nut 72 and 74 are tightened they will squeeze the trainer wheel supporting arm 78 in between the vertical supporting portion of the bracket 60 and the lower rear fork 68, thus effecting a clamping action on the same. This clamping action together with the support offered by the flanges 76 maintains the trainer wheel supporting arm in the position desired.

To effect vertical adjustment of the trainer wheel supporting arms 78 the nut and bolt 72 and 74 are loosened and the trainer wheel supporting arm 78 is raised or lowered to the position desired. As soon as the trainer wheel has been positioned in the elevation desired, the nut and bolt 72 and 74 are tightened thus securing the trainer wheel supporting arm 78 at the elevation desired. It will thus be noted that to make an adjustment of the trainer wheel supporting arm only one clamping nut 74 has to be loosened and there is no necessity for moving or loosening the rear axle nut 66 to effect an adjustment of the trainer wheel supporting arms 78.

Figure 5:
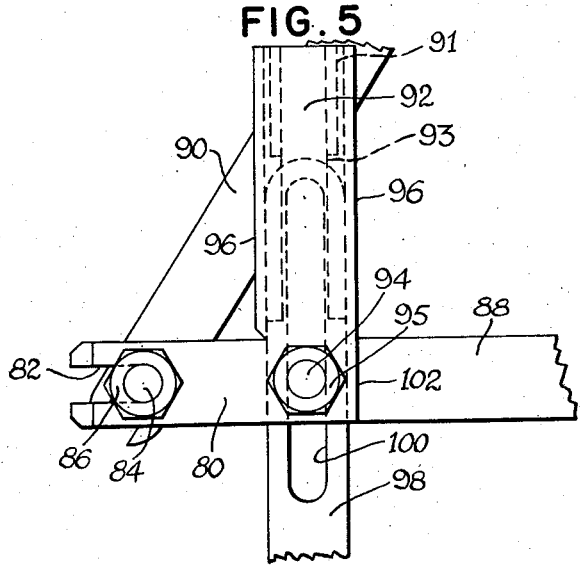
Fig. 5 is a side view of an additional modification of our improved trainer wheel attachment.

In Fig. 5 we have shown another embodiment of our invention. In this case we have shown how the bracket may be made in the formation of an L. The lower leg or arm 80 of the L has a slot 82 which is adapted to fit over the rear axle 84 of the bicycle. The lower leg 80 of the L-shaped bracket is secured in place by means of the axle nut 86 which, when tightened on the axle 84, squeezes the slotted portion of the lower leg 80 in between the nut and the framework of the bicycle consisting of the forks 88 and 90. A hole is formed in the L-shaped portion of the leg at the juncture of the vertical elongation 92 of the L-shaped bracket. Through this hole is inserted a bolt 94 which also passes through a hole formed in the lower fork 88.

The vertical member 92 has a pair of wrap-around, U-shaped flanges 96 for forming a channel way or guide way for the trainer wheel supporting bars 98. The upper portion of the wrap-around, U-shaped runways or guide ways may be made with an extension 91 which rests against the upper fork 90. This extension 91 extends from the rear portion 93 which surrounds the arm 98 at the back side. A slot 100 is formed in the trainer wheel supporting arm 98 to enable the trainer wheel supporting bars to be raised up and down in the channel ways formed by the U-shaped channels 96 when the nut 95 on the bolt 94 is loosened.

When the trainer wheel supporting arm 98 has been raised to the elevation desired, the nut and bolt 94 and 95 are tightened, thus squeezing the arms 98 in between the clamp 80 and the lower fork 88. In this regard it will be noted that the lower portion 102 on the edge of the L-shaped bracket does not extend so far as to contact the lower fork 88, thus permitting the bracket 80 to be squeezed sufficiently close to the lower fork 88 by means of the nut and bolts 94 and 95, so as to obtain a clamping effect on the trainer wheel supporting arm 98.

This particular embodiment of the invention has the advantage that when pressure is exerted on the trainer wheel bracket due to the leaning of the child on the bicycle it causes the trainer wheel to urge the lower portion of the arm 98 outwardly. The upper portion of the arm 98 which extends above the clamp bolt 94 will be pushed inwardly against the upper fork 90. Due to the wrap-around arrangement of the channel ways 96 and more particularly the rear portion 93 and the extensions 91 which cause the upper fork 90 to be engaged by extensions 91, thus receiving additional support for the bracket so that all of the pressure does not rest on the clamp, bolt and nut 94 and 95.

It will be understood that while we have shown in Figs. 4 and 5 only one trainer wheel supporting bracket, that a similar bracket is placed on the opposite side of the bicycle so that the child is provided with protection from tilting to either side when learning to ride a bicycle.

It will therefore be evident from the foregoing description that we have provided an improved trainer wheel support which is of an exceptionally simple design so as to facilitate its economical production, yet is durable and may be quickly loosened, and tightened, to effect a lowering and raising of the trainer wheel structure.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A support means for a bicycle trainer wheel on one side of a bicycle comprising a T-shaped bracket having an axle receiving slot formed in the stem end of the bracket, transverse guide flanges formed on the sides of the head end of the T-shaped bracket for forming a channel-way lengthwise of the head of the T-shaped bracket and transverse to the rear fork of a bicycle, a hole formed in the head end of the bracket, a slotted supporting bar mounted in said channel-way and having a trainer wheel supported at one end thereof, said slot being coextensive with said hole to allow the bar to be moved up and down in said channel way, and a clamping device extending through said hole for squeezing said bar in said channel between said head and said rear fork to prevent the same from being moved up and down.

2. Supporting means for bicycle trainer wheels comprising an angular bracket having one leg extending longitudinally along one side of the lower rear fork of a bicycle and having one end thereof clamped to the bicycle frame by the rear axle nut, an arm mounted on the other end of said longitudinally extending leg and having a hole formed therein, said rear bicycle fork having a corresponding hole, flanges formed on said arm for forming a transverse channel relative to said longitudinally extending leg, a trainer wheel supporting rod extending through the channel formed in said arm, and a clamping bolt and nut for joining in common through said holes said arm, rod, and rear bicycle fork to prevent the rod from moving relative to the rear bicycle fork.

3. A trainer wheel fork comprising an arm having a trainer wheel mounted at one end thereof, a clamping and guiding bracket comprising a sheet metal member formed to have elongated members extending in transverse directions, means for securing one end of one of said elongated members to the rear axle of the bicycle wheel, and a clamp for securing the other end of said elongated member to the rear fork of a sidewalk bicycle, and flanges formed on the transverse elongated member to provide a channel for receiving said arm and confining it to a rectilinear path of movement, said clamp acting to squeeze said arm between said rear bicycle fork and the transverse, elongated, sheet metal member to maintain the arm immovable relative to said frame and bracket.

4. A support for bicycle trainer wheels comprising a sheet metal bracket having an arm, a pair of holes formed in said bracket at spaced distances from each other and being adapted to be positioned against the outside of the rear fork of the bicycle, one of said holes being fitted over the rear axle of said bicycle and secured to the axle and to the rear frame of the bicycle by the rear axle nut, a hole formed in said rear fork and being coextensive with the other hole formed in said bracket, guides formed on said sheet metal bracket so as to form a channel substantially transverse to a center line extending through the two holes formed in said sheet metal bracket, a trainer wheel supporting bar arm adjustably mounted in said channel for movement therealong, and a clamp screw passing through said coextensive holes for squeezing said sheet metal bracket against the rear fork of the bicycle to clamp the trainer wheel supporting arm therebetween.

5. A bicycle trainer wheel support for one side of a bicycle comprising an elongated bar having a trainer wheel mounted at one end thereof, a bracket having a hole formed therein to coact with a slot in said elongated bar, coextensive with a hole formed in a rear fork of a bicycle, a bolt for joining in common said bracket, said slotted elongated bar and said rear fork, and an axle receiving opening formed in said bracket at a distance from said channel to prevent said bracket from swiveling around said clamp while supporting the trainer wheel supporting bar against movement relative to said bracket.

6. A trainer wheel supporting means for one side of a bicycle comprising a supporting bracket formed in the shape of a cross, a shaft receiving opening formed in one arm of said cross and being adapted to be secured by the rear axle nut to the rear axle and axle supporting frame of the bicycle, said arm extending along the length of one side of said rear fork and having a clamping device associated with the opposite end of said arm to clamp the arm against said rear fork, a channel formed by ears projecting from the other arm of said supporting bracket for receiving a trainer wheel supporting bar and confining the bar to lengthwise movement along said channel when said clamping device is loosened and for holding said bar immobile relative to said bracket when said clamp is tight.

7. A trainer wheel supporting apparatus comprising an elongated bracket having a pair of spaced openings located at opposite ends and a transverse channel-way formed thereon, means for clamping one end of the bracket having one of said openings to the rear axle of the bicycle, a trainer wheel supporting bar mounted in the channel-way of said bracket, and a clamp for squeezing the bar between the bracket and the rear fork of the bicycle and the other of said openings to said rear fork.

References Cited in the file of this patent
UNITED STATES PATENTS

| | | |
|---|---|---|
| 2,530,498 | Atwood et al. | Nov. 21, 1950 |
| 2,647,764 | Anderson | Aug. 4, 1953 |

FOREIGN PATENTS

| | | |
|---|---|---|
| 642,150 | France | May 2, 1928 |
| 689,864 | France | July 30, 1930 |
| 1,064,977 | France | Dec. 30, 1953 |
| 689,859 | Great Britain | Dec. 28, 1950 |